United States Patent [19]
An

[11] Patent Number: 5,091,781
[45] Date of Patent: Feb. 25, 1992

[54] CAMERA MOVING APPARATUS

[75] Inventor: Byeong-eui An, Seoul, Rep. of Korea

[73] Assignee: SamSung Electronics Co., Ltd., Suwon, Rep. of Korea

[21] Appl. No.: 491,977

[22] Filed: Mar. 12, 1990

[30] Foreign Application Priority Data

Jul. 27, 1989 [KR] Rep. of Korea .................. 89-10631

[51] Int. Cl.$^5$ .......................................... H04N 5/225
[52] U.S. Cl. ...................... 358/125; 358/126; 358/209
[58] Field of Search ............... 358/126, 125, 209, 210

[56] References Cited

U.S. PATENT DOCUMENTS

| | | | |
|---|---|---|---|
| 3,039,002 | 6/1962 | Guerth | 358/125 |
| 3,953,669 | 4/1976 | Saccomani et al. | 358/126 |
| 4,805,018 | 2/1989 | Nishimura et al. | 358/125 |

FOREIGN PATENT DOCUMENTS

60-150390 8/1985 Japan ............................ 358/126

Primary Examiner—James J. Groody
Assistant Examiner—Tuan V. Ho
Attorney, Agent, or Firm—Robert E. Bushnell

[57] ABSTRACT

A camera moving circuit senses movement of a subject and automatically initiates camera movement in the direction of movement by the subject. The circuit uses a plurality of memories, a switching stage, a plurality of adders and subtractors, and a stage for moving a camera. In operation, the circuit detects a signal corresponding to a difference obtained by comparing previous action of the subject with subsequent action of the subject, and drives a motor attachable to the camera to make the camera automatically move with the movement of the subject, whereby the camera is enabled to automatically track and photograph the subject.

6 Claims, 7 Drawing Sheets

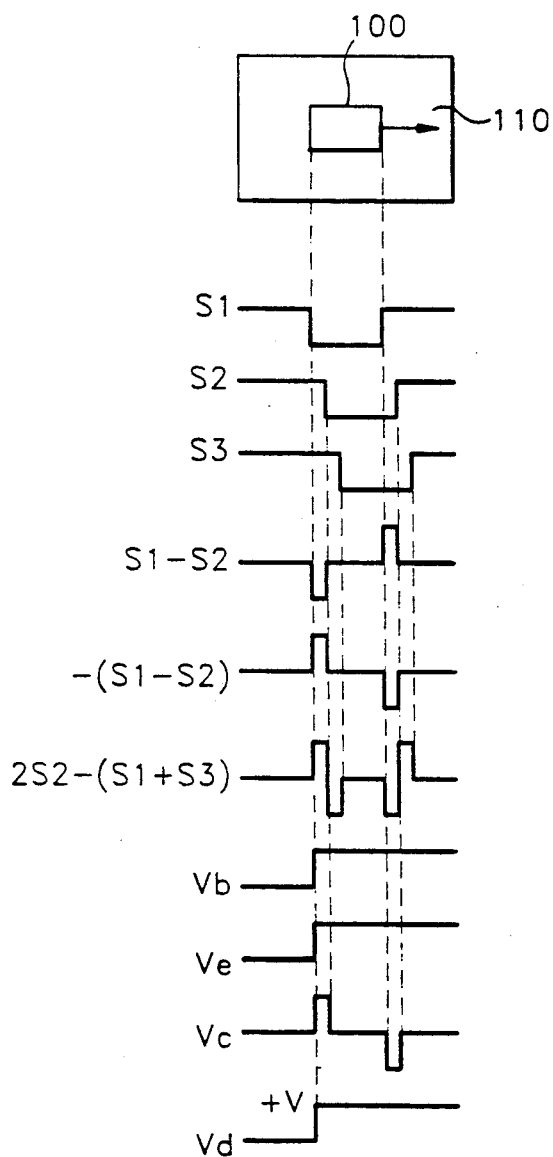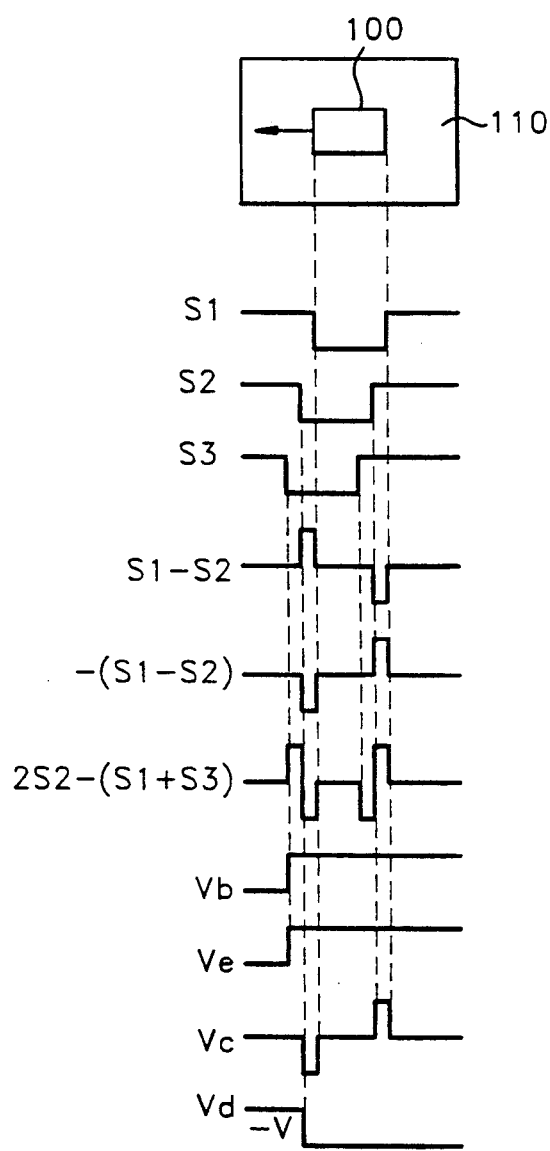

CAMERA MOVING APPARATUS

FIELD OF THE INVENTION

The present invention relates to a camera moving apparatus and, more particularly to the camera moving apparatus which senses a subject as it moves and moves the camera in the moving direction of the subject and takes a picture of it.

BACKGROUND OF THE INVENTION

When taking a picture of a moving subject using a video camera for television broadcasting or a portable camera, the user himself had to track the moving subject to be pictures. In the case of a surveillance camera, the camera is generally fixed so that it monitors an established region, and therefore can not supply a wide scope of photograph.

SUMMARY OF THE INVENTION

It is an object of the present invention to provide a camera moving apparatus which takes a photograph of a moving subject by automatically tracking the moving subject so as to keep the subject located within the cameras field of view at all times.

To accomplish the object, the present invention is characterized by comprising:

plural picture memory means which sample the picture of a moving subject and memorize it in order;

a switching means which multiplexes the signals outputted from the plural picture memory means by means of the controlling signals outputted from a controller, respectively;

plural adding and subtracting means which add and subtract the picture signals switched in and outputted from the switching means; and a camera moving means which makes a camera moved in the direction of a subject by detecting the peak value of the signal outputted from said respective adding and subtracting means.

In the present invention, the picture memory means comprises at least, three sampling circuits for sampling the picture signals of a subject inputted by the prescribed time interval and, at least, three picture memory cells which memorize the sampled signals, and the controller for controlling the sampling circuits and the picture memory cells.

The above objects and other advantages of the present invention will become more apparent by describing the preferred embodiment of the present invention with reference to the attached drawings.

DETAILED DESCRIPTION

Figure 1:
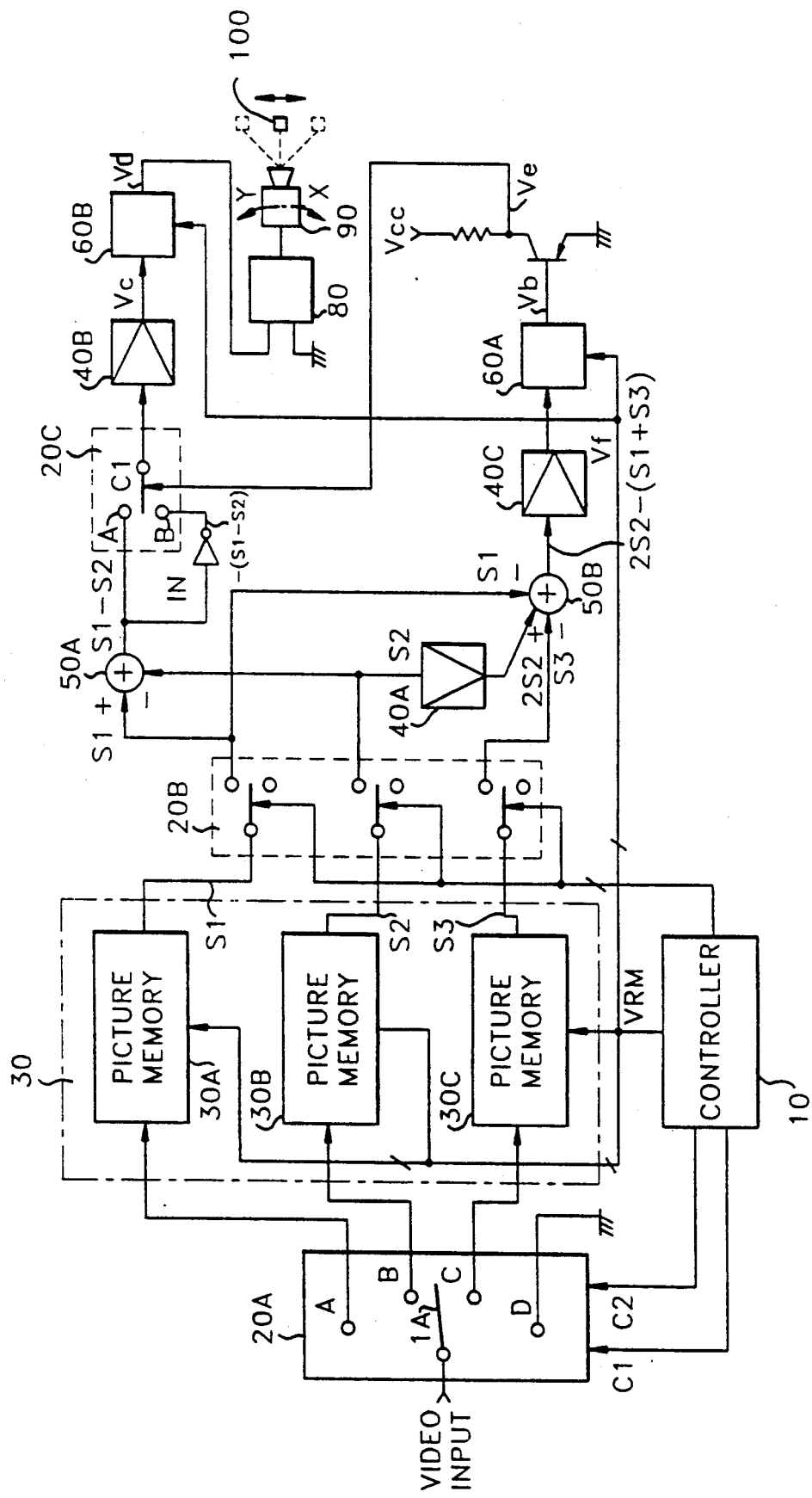
FIG. 1 is a schematic circuit diagram illustrating a camera moving apparatus according to the present invention.
Figure 3:
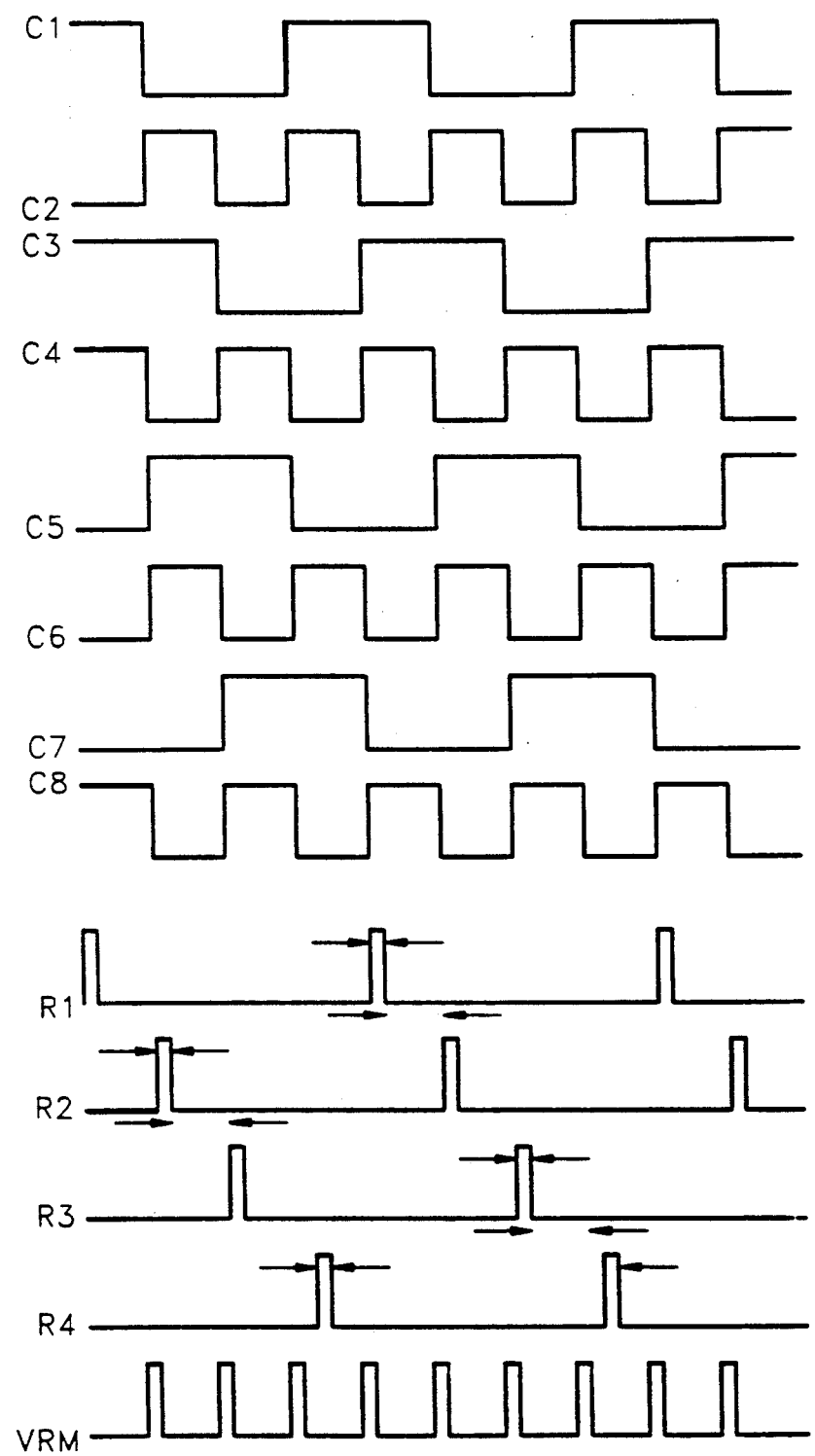
FIG. 3 is a waveform diagram showing the output waveform of a controller which is included in a camera moving apparatus shown in FIG. 2.

In the camera moving apparatus of FIG. 1, a first switching means 20A is arranged so as to receive only the brightness component of the video signals generated in a video signal processing portion (not shown in FIG. 1), and to switch between the signal lines A to D with a predetermined switching interval, for example, 0.5 to 1.5 second, under the control of controlling signals C1,C2 provided by controller 10 and to be inputted to the plural picture memory means 30. The first switching means thereby switches the video signals so as to input them to a plurality of picture memory means to the contact 1A of the first switching means 20A being connected to line A when both of the controlling signals C1,C2 of FIG. 3 showing the controlling signal waveform diagram of a controller 10 are low (0) and being connected to line B when the controlling signals C1,C2 are equal to low (0), high (1) respectively, and being connected to D when the controlling signals C1,C2 are equal to high (1), high (1) respectively.

Thus, a picture is memorized in the plural picture memory means 30 in accordance with the state of the controlling signals C1,C2. For example, when the contact 1A of the first switching means 20A is connected to line A, first frame is directed to and memorized in the picture memory 30A, and, when the contact 1A is connected to B after t seconds, a picture is directed to and memorized in the picture memory 30B and, after another t seconds, a picture is sent to and memorized in the picture memory 30C.

The picture memorized as above is maintained stored until a reset pulse VRM is supplied from a controller 10 and is outputted when a second switching means 20B is operated by a switch controlling signal of the controller 10.

The picture signal S1 which is thus outputted from the picture memory 30A in the picture memory means 30 is applied by the second switching means 20B to means 50A, 50B. The picture signal S2 is directly applied to an adding/subtracting means 50A and is, at the same time, applied to adding/subtracting means 50B after being doubled in magnitude by an the amplifying means 40A.

Also, the picture signal S3 is directly applied by the second switching means 20B to the adding/subtracting means 50B.

The adding/subtracting means 50A is so composed as to add the picture signal S1 and subtract the picture signal S2, and supply the result to a terminal A of a third switching means 20C, while the adding/subtracting means 50B is so composed as to add the value of the doubled picture signal S2 and subtract the values of the picture signal S1 and the picture signal S3, and to input the result to amplifying means 40C.

Also, after the result of addition/subtraction of the signals S1,S2 by the adding/subtracting means 50A inverted by an inverter In, it is applied to another terminal B of the third switching means 20C.

The contact C1 of the third switching means 20C is switched between terminal A and terminal B in accordance with a controlling signal which is outputted from the controller 10.

For example, when contact C1 of the third switching means 20C is located at terminal A, the signal S1-S2 is inputted to an amplifying means 40B and, when it is located at terminal B, the signal (S1-S2) is inputted to the amplifying means 40B.

The signal 2S2−(S1+S3) on the one hand and S1−S2 or (S1−S2) on the other hand are applied to respective peak value detecting means 60A, 60B and these peak value detecting means 60A, 60B can each whether the first value of inputted thereto signal is positive or negative.

Figure 4:
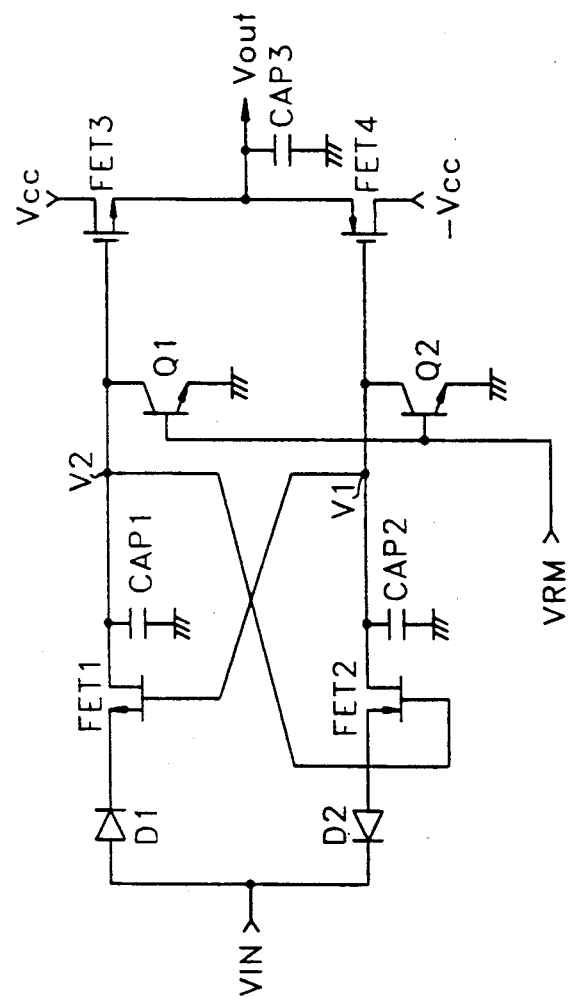
FIG. 4 is a detailed circuit diagram of a peak value detecting means which is included in the apparatus shown in FIG. 1 and FIG. 2.

FIG. 4 is detailed circuit diagram of the peak value detecting means 60A, 60B, each of which is arranged to supply a constant direct current to its output line until the reset signal VRM is received from the controller 10, by detecting the peak value of the input signal amplified in the respective amplifying means 40B, 40C.

The construction of the two peak value detecting means 60A, 60B, is similar and therefore only one such detecting means is shown in FIG. 4.

Each peak value detecting means 60A, 60B has the ability to detect an initial value of two different polarities, namely positive and negative compared with a normal peak value detector which can detect only one such polarity.

Figure 5A:
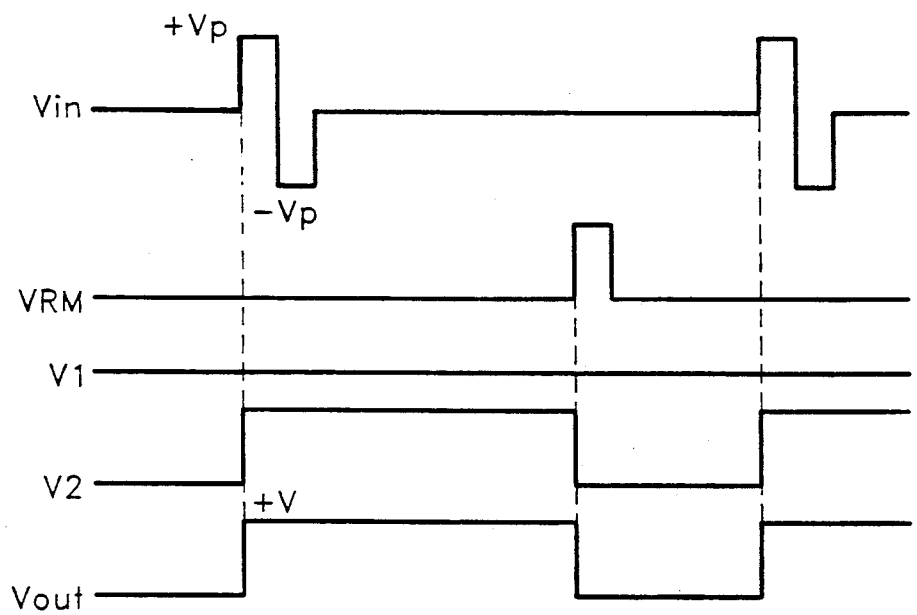
FIG. 5 A and B are waveform diagrams for explaining the operation of the peak value detecting means which is shown in FIG. 4.

First, as shown in FIG. 5A, when a first peak value which is inputted from the amplifying means 40B, or 40C is positive, (+Vp) two field effect transistors FET1, FET2 turn on if no voltage is applied to the gate electrode of thereof.

Consequently if a positive input signal Vin is applied to the peak value detecting means 60A, 60B, a diode D1 turns on and a diode D2 turns off.

Accordingly, the peak value which is detected by a capacitor CAP makes a transistor FET3 turn on until the reset signal received from the controller, 10 and supplied the positive voltage+Vcc as a motor driving voltage of a camera moving means 80 on its output line Vout.

Now, when the signal having the negative peak value is the positive peak value (+Vp), a diode D2 turns on and, in order not to have an influence on the output, a transistor FET2 is turned off by applying the direct voltage which passes a transistor FET1 to the gate of the transistor FET2 and therefore, the output is isolated from the affects of such a negative peak value.

Therefore, when an initial positive pulse is inputted, transistors FET1, FET3 turn on and transistors FET2, FET4 are maintained to turn off. When the reset pulse VRM is inputted from a controller 10, both of transistors Q1,Q2 turn on and voltages V1,V2 both become 0.

At this time, the transistor FET2 turns on, the output Vout, the output Vout becomes 0, and the circuit is ready for the next signal.

Figure 5B:
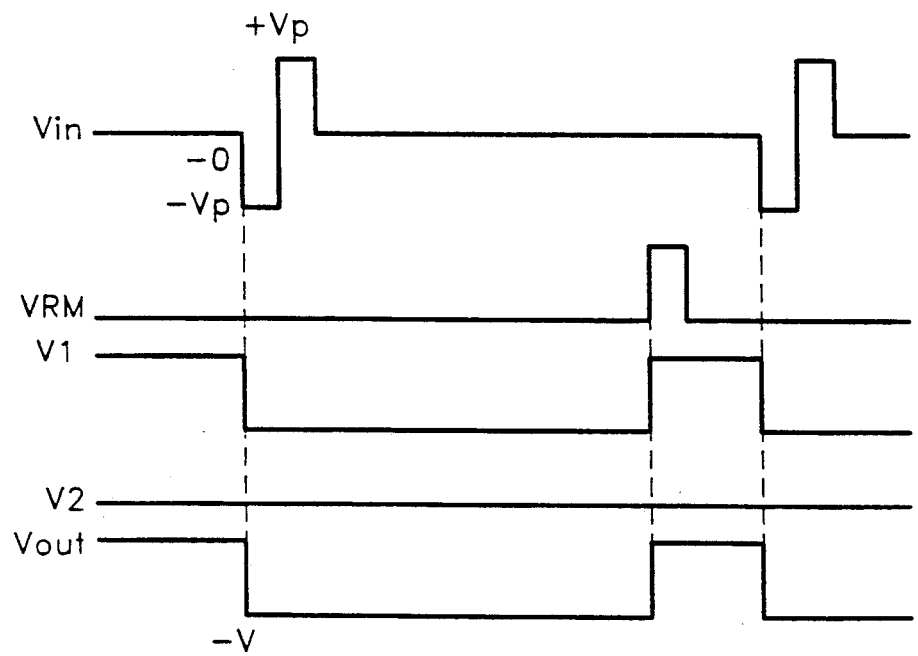

Now, as shown in FIG. 5B, when the initial peak value of the signals which are inputted from the amplifying means 40B or, 40C is negative, a diode D1 turns off and, on the other hand, a diode D2 turns on. At this time, the negative peak value which is detected by a capacitor CAP2 turns the transistor FET1 off and prevents any subsequent positive peak value included in signal from being detected by a capacitor CAP.

The signal detected by the capacitor CAP2 turns the transistor FET4 so as to supply the negative voltage-Vcc to the output line Vout. When the reset signal VRM is inputted from a controller 10, the output line is returned 0 to in readiness for the next signal.

Figure 6A:
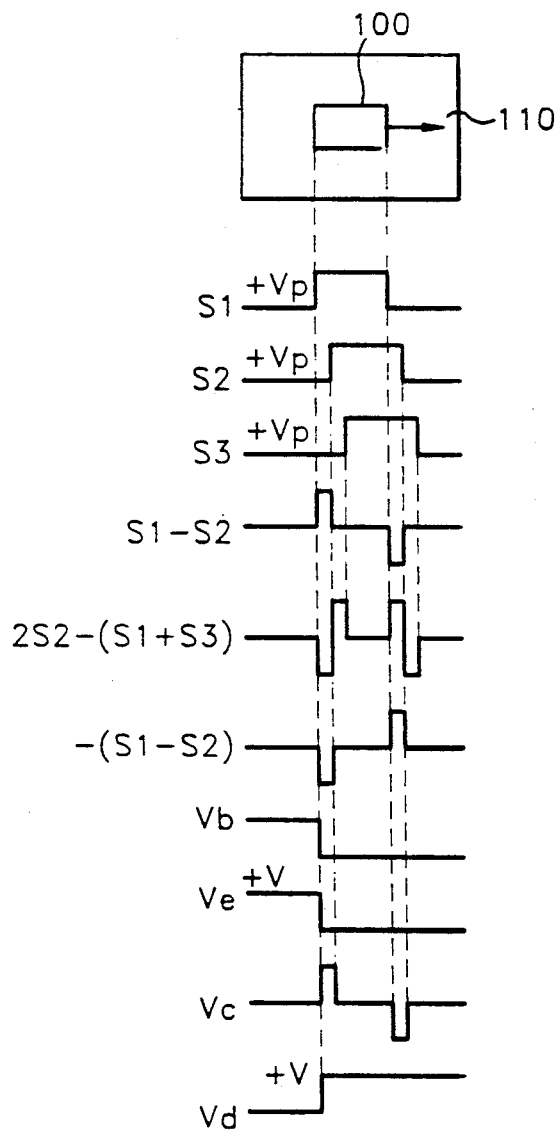
FIG. 6 A,B are waveform diagrams of the signal appearing at various parts of the circuit FIG. 2 when a white subject on a black background in the camera's field of view moves to the right and to the left, respectively, and FIG. 7 A, and B are waveform diagrams of the signals appearing at various parts of the circuit of FIG. 2 when a black subject on a white background moves in the camera's field of view to the right and to the left, respectively.
Figure 6B:
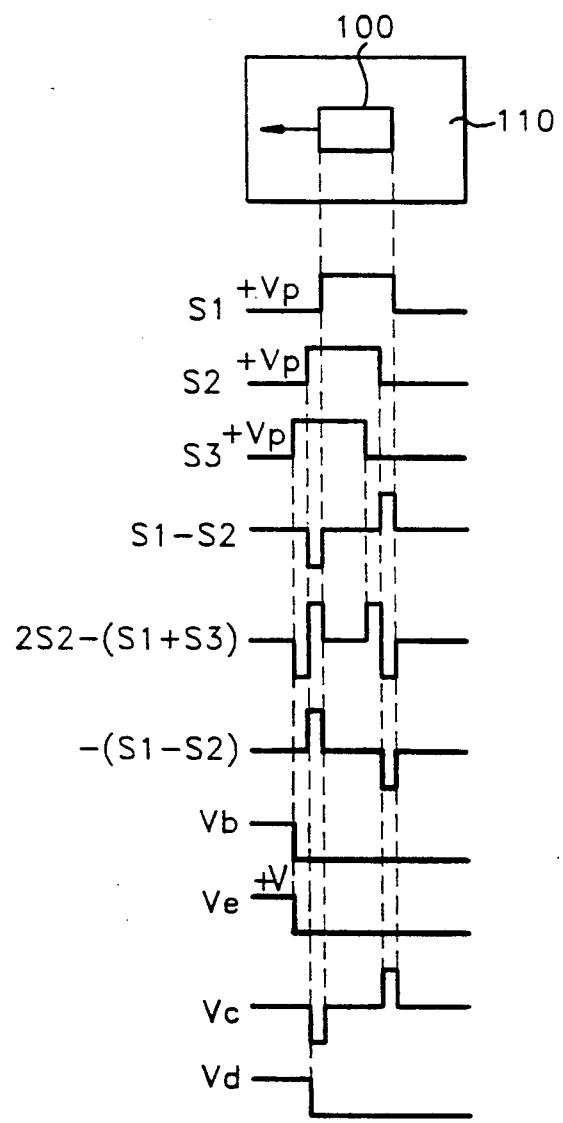

FIG. 6 illustrates a signal waveform diagram of the case that a subject 100 moves to the right in FIG. 6A, and a subject 100 moves to the left in FIG. 6B when the brightness level of a moving subject 100 is higher than that of a background 110.

Figure 2:
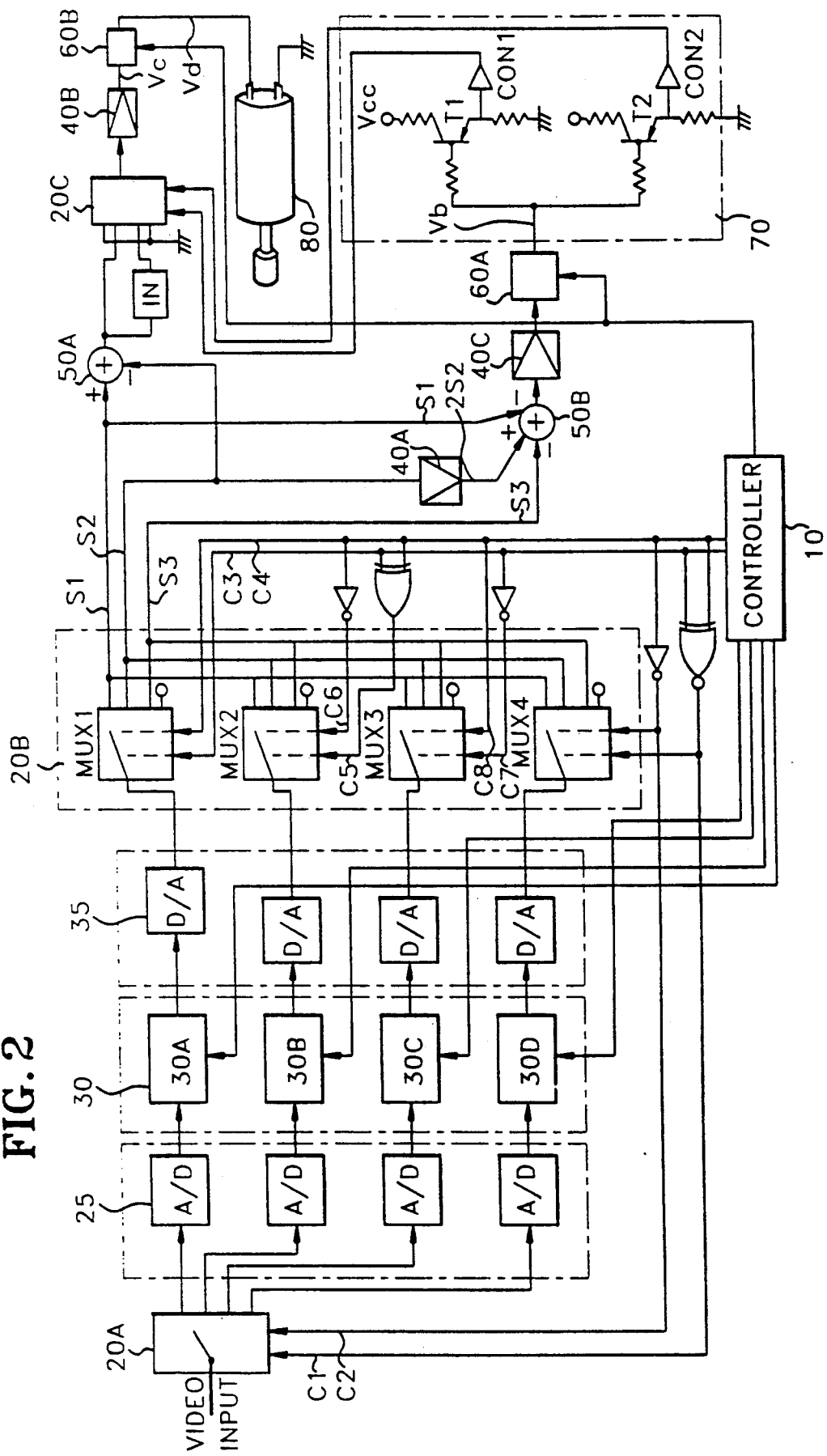
FIG. 2 is a somewhat more detailed circuit diagram showing the embodiment of a camera moving apparatus as shown in FIG. 1.

First, as shown in FIG. 6A, when a white subject 100 moves to the right, a video signal which is inputted to the first switching means 20A in FIG. 2 is switched at the interval of t seconds under the control of the controlling signals such as C1,C2 of FIG. 3 outputted from a controller 10, is A/D converted by an A/D converter 25 and is memorized in the picture memory means 30.

After the signal memorized as above passes through a D/A converter 35, it is supplied to the second switching means 20B which is operated by controlling signals such as C3 to C8 in FIG. 3 outputted from a controller 10. In FIG. 3, the Signals C2 and C4 are equal to the signals C6 and C8, respectively.

The signals S1,S2,S3 which are outputted from the second switching means 20B are supplied to the adding substrating means 50A, 50B signal which is outputted from the adding subtracting means 50A becomes S1-S2, and the signal which is outputted from the adding/subtracting means 50B becomes 2S2−(S1+S3).

The signal, S1-S2 which is outputted from the adding/subtracting means 50A is directly applied to the third switching means 20C, and is at the same time, applied to the third switching means 20C after it is converted to a signal −(S1-S2) by an inverter IN.

Then, the signal 2S2−(S1+S3l) which is outputted from the adding/subtracting means 50B is applied to the first peak value detecting means 60A by way of the amplifying means 40C.

As shown in FIG. 6A because first peak value of 2S2−(S1+S3) in the first peak value detecting means 60A is negative, the output Vb therefrom becomes low state and makes a transistor t2 turn on.

When the transistor T2 turns on, because the output of a converter CON2 becomes low state, the third switching means 20C selected the signal, S1-S2 and amplifies it through an amplifying means 40B and then it is applied to the second peak value detecting means 60B as a voltage Vc.

At this time, because the first peak value of the voltage Vc applied the second peak value detecting means 60B is positive as described above, it makes the direct voltage signal Vd of a high state and applies the constant voltage to the motor which operates as a camera moving means 80.

At this time, a camera moving means moves a camera 90 in the direction of the right (X direction).

Therefore, since the camera 90 also moves in the direction of X (to the right in FIG. 6) when the subject 100 moves the right, it can automatically track the subject and take a picture of it.

On the other hand, as shown in FIG. 6B, when a white subject 100 moves in the direction of the left under the black background, because the first peak value of the output signal S1-S2 of the first adding/subtracting means 50A is negative, and the first peak value of the output signal 2S2−(S1+S3) of the second adding/subtracting means 50B is also negative, the output Vb of the first peak value detecting means 60A becomes low state, and therefore the signal which is outputted from the third switching means 20C becomes S1–S2, as described above.

After the signal S1–S2 is amplified by the second amplifying means 40B, it is inputted to a second peak value detecting means 60B.

This time, because the first peak value of the voltage signal Vc applied to the second peak value detecting means 60B is negative, the second peak value detecting means 60B outputs the voltage signal Vd of low state.

Thus, a negative voltage is applied to the camera moving means 80 and the camera 90 moves in the direction of to the left(Y direction).

In other words, when the subject 100 moves in the direction to the left, because the output Vd of the second peak value detecting means 60B is low, a negative voltage is applied to the camera moving means 80 and, in accordance with this negative voltage, the camera 90 moves in the direction to the left so as to track the moving subject 100.

FIG. 7 illustrates a signal waveform diagram of the case where a subject 100 moves to the right in FIG. 7A and the subject 100 moves to the left in FIG. 7B, when the brightness level of the moving subject 100 is lower than that of the background 110.

In FIG. 7, picture signals S1 to S3 corresponding to subject 100 are low state because the brightness of the subject 100 is lower than that of the background 110, in contrast with the signal levels in FIG. 6.

First as shown in FIG. 7A, when the subject 100 moves to the right, the signal S1–S2 and the signal, –(S1–S2) are applied to the third switching means 20C, respectively and a first peak value of the output 2S2–(S1+S3) of the second adding/subtracting means 50B becomes high state.

At this time, because the output of the first peak value detecting means 60A is at high state, a transistor T1 turns on and therefore the signal which is outputted from the third switching means 20C becomes the signal (–S1–S2) which is outputted from the inverter IN.

Because the signal, –(S1–S2) which is outputted from the third switching means 20C is applied to the second peak value detecting means 60B as the voltage Vc through a second amplifying means 40B, the output Vd of the second peak value detecting means 60B becomes high state as described above, and therefore, the camera 90 can track the subject 100 automatically and take a picture of it by moving in the direction of X(the right direction in FIG. 7).

On the other hand, when the white-on-black subject 100 moves to the left, because a first peak value of the signal –(S1–S2) is negative, the output of the second peak value detecting means 60B becomes low state as seen in the signal waveform diagram which is shown in FIG. 7B, and therefore the camera 90 can track the subject 100 automatically and take a picture of it by moving in the direction to the left.

The apparatus described above, in accordance with the present invention detects the signal corresponding to subject movement by comparing successive second occurrence actions of the subject, and drives the motor which is attached to a camera using such detection signal and thereby makes the camera move automatically with the movement of subject so that it can make track for a subject and take a picture of a subject, automatically.

Therefore, when the present invention is applied to a surveillance camera, it has the effect of providing a the wide photographing field.

What is claimed is:

1. A camera moving apparatus, comprising:
   picture memory means sampling and storing picture signals representing images of a moving subject in order;
   switching means for multiplexing picture signals from said picture memory means in accordance with controlling signals from a controller;
   plural adding and subtracting means for adding and subtracting the picture signals from said switching means; and
   camera moving means for making a camera move in the direction of movement of a subject by detecting a peak value of an output signal from said respective adding and subtracting means.

2. A camera moving apparatus as claimed in claim 1, wherein said camera moving means is adapted to a CCTV.

3. A camera moving apparatus as claimed in claim 1, wherein said picture memory means comprises at least three sampling circuits for sampling the picture signals of the subject input within a predetermined time interval, and at least three picture memories for storing the sampled signals.

4. Apparatus for moving a camera so as to enable the camera to track a moving subject, comprising:
   means for producing a plurality of successive picture signals;
   arithmetic processing means for processing said picture signals to produce a pulse signal in which the polarity of an initial pulse of the pulse signal is indicative of the direction of movement of the subject;
   means for producing a control signal in accordance with said polarity of the initial pulse; and
   means for driving the camera in a direction determined by said control signal.

5. A camera moving apparatus as claimed in claim 4, wherein said means for producing said plurality of picture signals includes at least three sampling circuits for providing sampled signals by sampling the picture signals of the subject inputted by a predetermined time interval, and at least three picture memory cells for storing the sampled signals.

6. A process for moving a camera so as to enable the camera to track a moving subject, comprising the steps of:
   producing a plurality of successive picture signals;
   arithmetically processing said picture signals to produce a pulse signal in which the polarity of an initial pulse of the pulse signal is indicative of the direction of movement of the subject;
   producing a control signal in accordance with said polarity of the initial pulse polarity; and
   driving the camera in a direction determined by said control signal.

* * * * *

UNITED STATES PATENT AND TRADEMARK OFFICE
CERTIFICATE OF CORRECTION

PATENT NO. : 5,091,781
DATED : 25 February 1992
INVENTOR(S) : Byeong-eui AN

It is certified that error appears in the above-identified patent and that said Letters Patent is hereby corrected as shown below:

Column 1,    Line 40,    replace "moved" with --move--;

Line 44,    delete the comma;

Column 2,    Line 1,    replace "FIG." with --FIGS.--;

Line 4,    replace "FIG." with --FIGS.--, and replace the comma with --and--;

Line 9,    replace "FIG." with --FIGS.--, and delete the comma;

Line 22,    replace "second" with --seconds--;

Line 39,    insert --the-- before "first";

Line 56,    delete "an the";

Column 3,    Line 17,    replace "each" with --determine--;

Line 35,    delete "which";

Line 38,    delete "of";

Line 39,    replace "Vin" with --$V_{in}$--;

Line 43,    replace "CAP" with --CAP1--;

Line 44,    delete the comma.

UNITED STATES PATENT AND TRADEMARK OFFICE
CERTIFICATE OF CORRECTION

PATENT NO. : 5,091,781
DATED : 25 February 1992
INVENTOR(S) : Byeong-eui AN

It is certified that error appears in the above-identified patent and that said Letters Patent is hereby corrected as shown below:

Column 3, Line 47, replace "Vout" with --$V_{out}$--;

Line 61, replace "Vout" (first occurrence) with --$V_{out}$--, and delete "the output Vout";

Line 65, delete the first comma;

Column 4, Line 2, replace "CAP" with --CAP2--;

Line 5, replace "Vout" with --$V_{out}$--;

Line 7, delete "0", and delete "in";

Line 24, replace "Signals" with --signals--;

Line 61, insert --to-- after "moves";

UNITED STATES PATENT AND TRADEMARK OFFICE
CERTIFICATE OF CORRECTION

PATENT NO. : 5,091,781

DATED : February 25, 1992

INVENTOR(S) : Byeong-eui AN

It is certified that error appears in the above-identified patent and that said Letters Patent is hereby corrected as shown below:

Column 6, line 6, delete "the".

Signed and Sealed this

Twenty-fifth Day of May, 1993

Attest:

MICHAEL K. KIRK

*Attesting Officer*     Acting Commissioner of Patents and Trademarks